United States Patent [19]
Marsh, Jr.

[11] Patent Number: 5,388,470
[45] Date of Patent: Feb. 14, 1995

[54] CENTRIFUGAL FORCE DRIVE MACHINE

[76] Inventor: Richard O. Marsh, Jr., 405 Meadow La., Sewickley, Pa. 15143

[21] Appl. No.: 83,357

[22] Filed: Jun. 28, 1993

[51] Int. Cl.⁶ .................................... F16H 33/20
[52] U.S. Cl. .................................. 74/84 R; 74/61; 173/49; 366/128
[58] Field of Search ............... 74/61, 84 R, 84 S, 87, 74/DIG. 9; 173/49; 366/128

[56]  References Cited

U.S. PATENT DOCUMENTS

| | | |
|---|---|---|
| 2,389,709 | 11/1945 | Anders . |
| 2,528,386 | 10/1950 | Napper . |
| 3,142,901 | 8/1964 | Bodine . |
| 3,286,536 | 11/1966 | Hallmann . |
| 3,507,162 | 4/1970 | Nomura et al. . |
| 3,513,713 | 5/1970 | Schumacher . |
| 3,584,515 | 6/1971 | Matyas . |
| 3,612,188 | 10/1971 | Ono . |
| 3,807,244 | 4/1974 | Estrade . |
| 3,810,394 | 5/1974 | Novak . |
| 3,871,617 | 3/1975 | Majima . |
| 3,964,322 | 6/1976 | Kieper . |
| 3,968,700 | 7/1976 | Cuff . |
| 3,998,107 | 12/1976 | Cuff . |
| 4,095,460 | 6/1978 | Cuff . |
| 4,152,953 | 5/1979 | Headley . |
| 4,238,968 | 12/1980 | Cook . |
| 4,241,615 | 12/1980 | Ryan . |
| 4,318,446 | 3/1982 | Livesay . |
| 4,408,740 | 10/1983 | Kleber . |
| 4,421,180 | 12/1983 | Fleishman et al. . |
| 4,570,616 | 2/1986 | Kunz et al. . |
| 4,579,011 | 4/1986 | Dobos . |
| 4,631,971 | 12/1986 | Thornson . |
| 4,712,439 | 12/1987 | North . |
| 4,788,882 | 12/1988 | Fulop . |

FOREIGN PATENT DOCUMENTS

| | | | |
|---|---|---|---|
| 933483 | 4/1948 | France . | |
| 7435395 | 10/1974 | France . | |
| 2610646 | 9/1977 | Germany | 74/845 |
| 573912 | 3/1958 | Italy . | |
| 52-4952 | 1/1977 | Japan | 74/DIG. 9 |
| 57-157075 | 9/1982 | Japan | 74/845 |
| 59-63375 | 4/1984 | Japan . | |
| 81820 | 5/1956 | Netherlands . | |
| 63188 | 9/1912 | Switzerland . | |
| 932782 | 7/1963 | United Kingdom . | |
| 2096268 | 10/1982 | United Kingdom . | |

*Primary Examiner*—Allan D. Herrmann
*Attorney, Agent, or Firm*—Walter J. Blenko, Jr.; George K. Stacey

[57] ABSTRACT

The centrifugal force drive machine for generating force in a controlled direction is provided. The machine includes a machine frame having a shaft mounted thereto for rotation about its axis. The drive mechanism is provided to rotate the shaft about its axis. At least one mass is mounted on the shaft for rotation therewith. Each mass has a center of gravity which is moveable radially with respect to the shaft between the position in which the mass is rotationally balanced about the shaft and a position in which the mass is unbalanced. A control member in an operative connection between the mass and the frame is provided to constrain radial movement of the mass between the balanced position and the unbalanced position during each revolution thereof. When a mass is in the unbalanced position, the centrifugal force generated by the rotation of the mass is transmitted to the control member, thereby generating a linear force in the controlled direction.

14 Claims, 12 Drawing Sheets

CENTRIFUGAL FORCE DRIVE MACHINE

BACKGROUND OF THE INVENTION

1. Field of the Invention

This invention relates to drive mechanisms and, more particularly, to drive mechanisms for converting a rotary motion into a linear force in a particular direction.

2. Description of the Prior Art

It is quite common in the mechanical arts to convert a rotary motion into a linear force. For example, in the pile driving area, it is desirable to translate a rotary force into a downward force which drives the pile into the ground. In the simplest version of a pile driver, a large weight is lifted vertically and then dropped onto the pile to drive it into the ground.

During the last 25 years, vibratory driver/extractors have come into wide use in the pile driving industry. The vibratory force is generated by one or more pairs of identical eccentrics having parallel axes of rotation. The pair of eccentrics rotate in opposite directions and are generally connected by gears so that they rotate in synchrony at the same speed. Such eccentrics are typically rotated by an electric motor or hydraulic drive unit.

These vibratory driver/extractors are primarily used on non-displacement piles, such as steel sheet piles, H-piles, open-end pipe piles and caissons. Conventional vibratory driver/extractors generate very high driving forces, from twenty to several hundred tons, but the force is actually reversed twenty to thirty times per second and so it does not really drive or extract the pile. A vibrating frame clamps onto the pile with a hydraulic clamp and the pile is vibrated up and down, generally on the order of $\frac{1}{4}$–$\frac{3}{4}$ of an inch, and at a frequency between 1,000– 2,000 cpm. This vibration breaks the frictional bond between the pile and the soil. The weight of the apparatus causes the pile to penetrate into the soil overcoming only the point resistance which is small on a non-displacement pile. In extraction, the vibration breaks the soil friction and the pile is lifted out of the ground by raising the extractor with a crane hammer line.

Vibratory apparatus may also be used to compact soil and other material.

Conventional vibratory driver/extractors rotate the eccentrics and transmit the driving force through axles mounted on roller bearings. Because of the extremely high stresses in these bearings, they are short-lived and a constant source of breakdowns. Vibratory driver/extractors currently in use typically generate a driving force in one direction, and then generate a fraction of a second later an equal force in the opposite direction.

It is an object of this invention to provide a machine which will develop, in a simple and durable arrangement, a near constant force in one direction and little or no force in the opposite direction. It is also an object of the present invention to develop such a device which will have particular utility in driving piles, but will also have other applications where generating a unidirectional force is desirable.

SUMMARY OF THE INVENTION

I provide a centrifugal force drive machine for generating a force in a controlled direction. The machine includes a machine frame having a shaft mounted thereto. The shaft is rotatable about its axis. Power means are provided in driving connection to the shaft and are operable to rotate the shaft about its axis. At least one mass is mounted on the shaft for rotation therewith. Each mass has a center of gravity which is movable radially with respect to the shaft between a position in which the mass is rotationally balanced about the shaft and a position in which the mass is rotationally unbalanced about the shaft. A control member is provided in operative connection between the frame and the masses to constrain the mass to move between a balanced position and an unbalanced position during each revolution of the masses. The center of gravity of each mass preferably travels in a generally oval path between the center of rotation of the shaft and a point spaced from the center of rotation in the controlled direction, thereby generating the desired force in the controlled direction.

The control member preferably includes a generally oval opening in the frame bounded by a track. The track is positioned to engage each mass for at least a portion of each revolution of each mass. The center of the track is spaced from the center of rotation in the controlled direction. In a preferred embodiment, the track is adjustable, thereby permitting variation of the controlled direction.

In one embodiment of this invention, one elongated mass is mounted on the shaft. The mass has a roller at each end to engage the control member. The center of gravity of the mass is located midway between the rollers. The control member includes a track having a first curved portion and second curved portion. The first curved portion is generally semi-circular, with a constant radius and a center that is offset from the center of rotation in the controlled direction. The second portion has a changing radius of curvature, such that the rollers of the mass are in juxtaposition to the track during each revolution of the mass.

Another embodiment of this invention provides two elongated masses of the type described above. The masses are mounted generally perpendicular to one another. The control member includes a track of the type described above, such that the rollers of both masses are in juxtaposition to the track during each revolution of the masses.

Yet another embodiment of this invention includes a machine frame having a shaft mounted thereto. The shaft is rotatable about an axis. Power means are provided in driving connection to the shaft to rotate the shaft about its axis. A mass is mounted on the shaft for rotation with the shaft at a constant radius. A second mass is mounted on the shaft for rotation with the shaft at a variable radius of rotation. A control member in operative connection between the second mass and the frame constrains the second mass to move so that the center of gravity thereof travels in a generally continuous path between a position with the same radius as the radius of rotation of the center of gravity of the first mass and a position in which the radius of rotation of the center of gravity of the second mass is different from that of the first mass. When the path of the center of gravity of the second mass has the same radius as the radius of rotation as the center of gravity of the first mass, the eccentric moment is balanced or zero. When the path of the center of gravity of the second mass is different from the radius of rotation of the center of gravity of the first mass, the eccentric moment results in creation of force in the controlled direction.

Another embodiment of this invention includes a machine frame having a shaft mounted thereto. The shaft is rotatable about its axis. Power means are provided in driving connection to the shaft and are operable to rotate the shaft about its axis. A mass in fixed rotational connection to the shaft and in unrestricted radial connection to the shaft is provided. The mass has a center of gravity that is eccentric generally in the controlled direction about the axis for at least one half of each revolution of the mass and concentric with the axis for at least part of each revolution of the mass. Control means are provided forming an inwardly facing surface surrounding the axis of the shaft and being of changing radius. The control means limits outward movement of the mass and transfers centrifugal force generated by rotation of the mass to the frame.

The objects discussed above as well as other details, objects and advantages of my invention will become more apparent as the following detailed description proceeds.

DETAILED DESCRIPTION OF PREFERRED EMBODIMENTS

Figure 1:
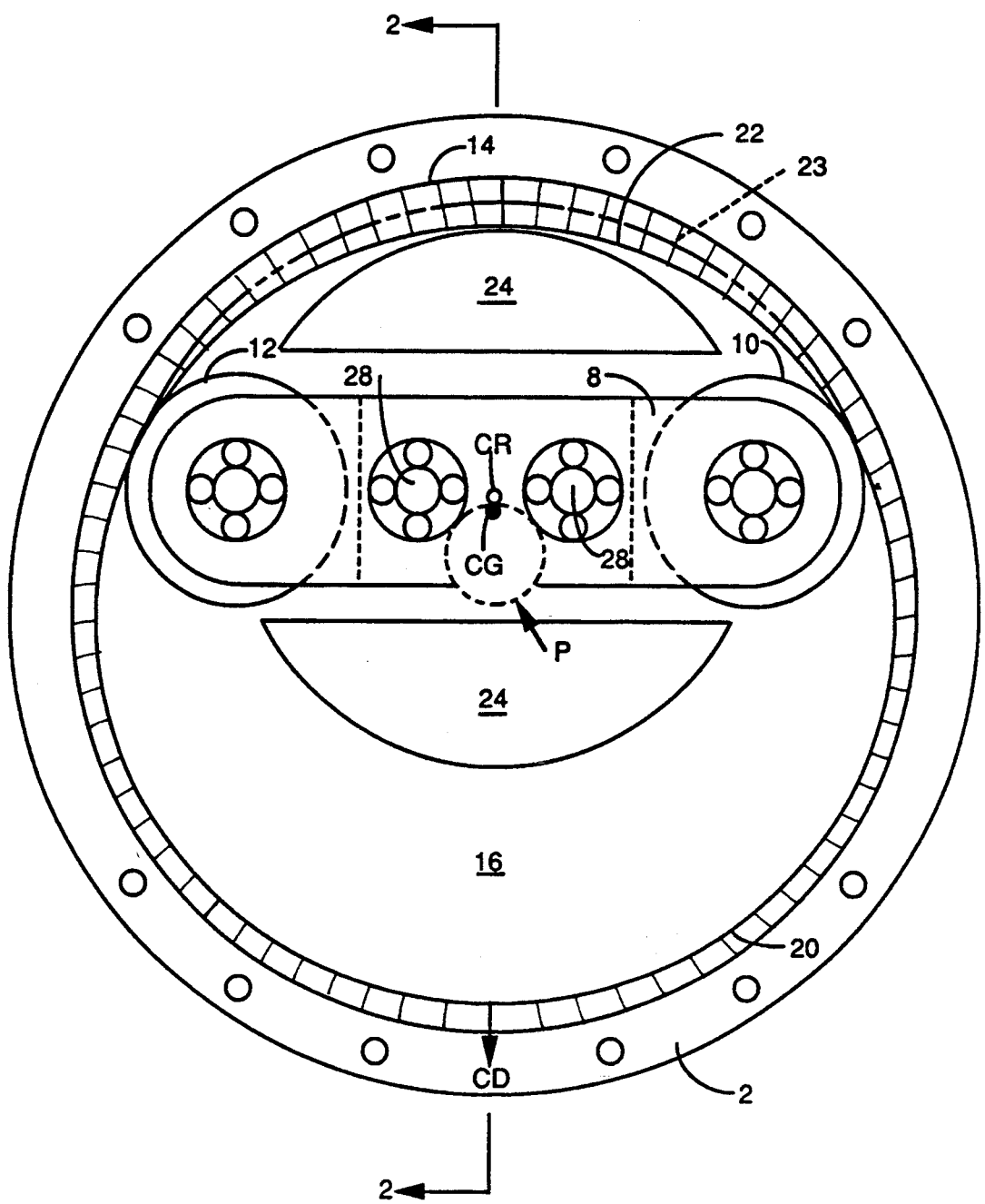
FIG. 1 is an elevational view of an embodiment of the centrifugal force drive machine of this invention with the mass shown in a balanced position about the center of rotation.

Referring to FIGS. 1–4, there is shown an embodiment of the centrifugal force drive machine of this invention. For purposes of illustration, the controlled direction in which the desired force is to be generated is represented by an arrow marked CD. The centrifugal force drive machine includes machine frame 2. Shaft 4 is mounted to machine frame 2. Shaft 4 is rotatable about its axis A. Power means 6 are provided in driving connection to shaft 4 and are operable to rotate shaft 4 about is axis A. Power means 6 may rotate shaft 4 using direct drive, gear drive, belt drive, chain drive or any other suitable drive arrangement known to those skilled in the art. Mass 8 is mounted on shaft 4 for rotation about a center of rotation CR. Mass 8 is preferably elongated and has a roller 10, 12 mounted at each end thereof. Control member 14 is in operable connection between frame 2 and mass 8. Rollers 10, 12 are positioned to engage control member 14 during each revolution of mass 8. The center of gravity CG of mass 8 is located generally midway between rollers 10, 12.

Control member 14 includes an opening, indicated generally by the number 16, in frame 2. Opening 16 is bounded by an inwardly facing, generally continuous track 18. Track 18 has a first curved portion 20 and a second curved portion 22. First portion 20 is generally semi-circular and has a generally constant radius. The center of first portion 20 is offset in a controlled direction from the center of rotation CR. Second portion 22 has a changing radius of curvature. Dotted arc 23 represents where the curve of semi-circular first portion 20 would be located if it were continued through the area bounded by second portion 22. Track 18 is preferably adjustably mounted to frame 2 to permit the controlled direction CD to be varied as desired.

Mass 8 is movable radially with respect to shaft 4. As mass 8 rotates, it moves radially from a position in which it is rotationally balanced about the shaft (shown in FIG. 1) and a position in which it is rotationally unbalanced about the shaft (shown in FIG. 3). Referring more particularly to FIG. 2, shaft 4 is provided with enlarged portion 24 having a transverse opening 26 therethrough. Mass 8 is received in opening 26. Mass 8 includes pins 28 which are received into slots 30, which are part of opening 26. Mass 8 may then move radially within opening 26 guided by pins 28. Alternatively, other suitable means known to those skilled in the art for permitting radial movement of mass 8 may be utilized.

As mass 8 revolves, the centrifugal force resulting from the rotation moves the mass radially outward. The extent of the radial movement is limited by the engagement of rollers 10, 12 with track 18.

Figure 2:
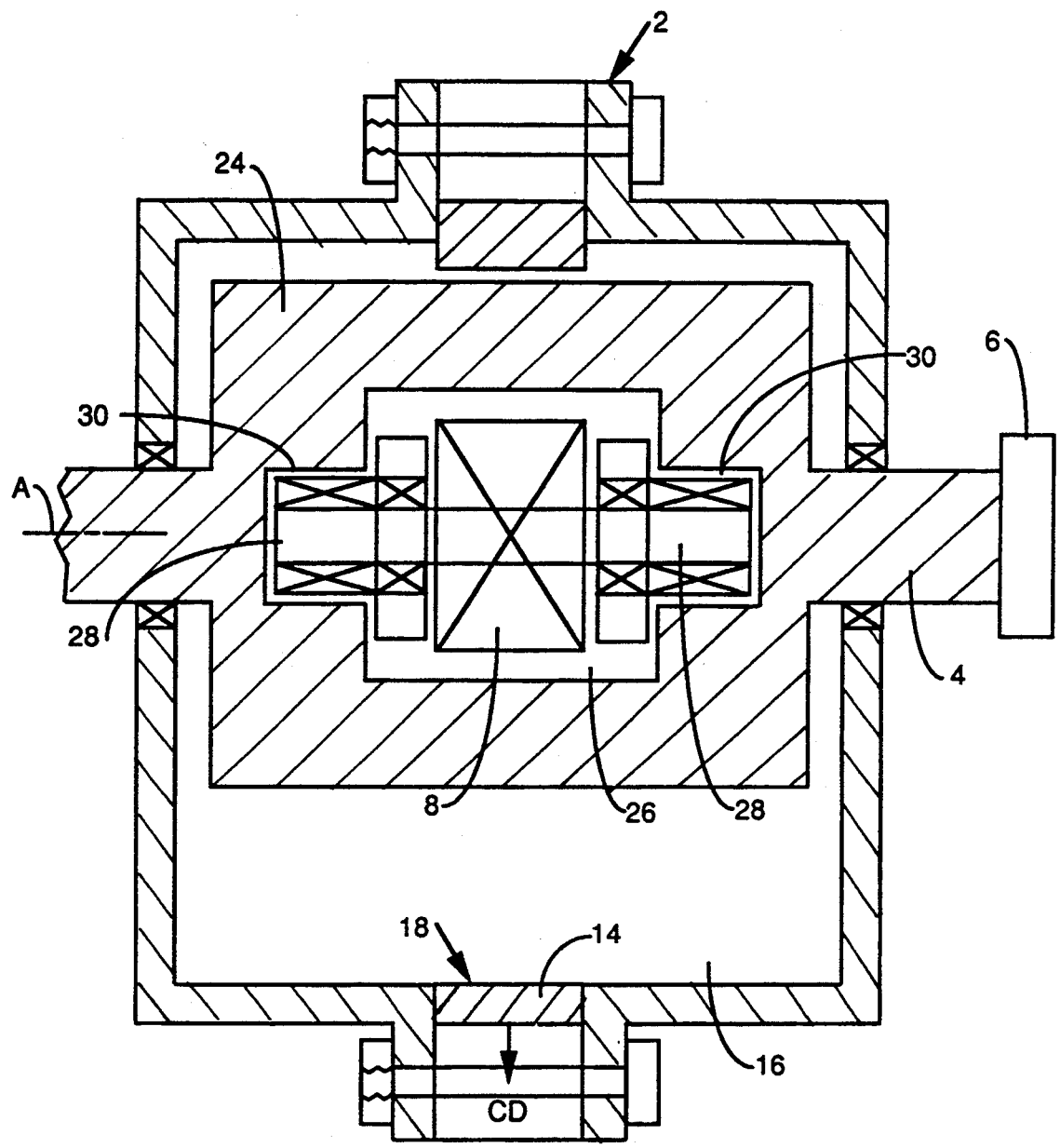
FIG. 2 is a cross-sectional view of the embodiment of this invention as shown in FIG. 1 and taken through line 2—2 of FIG. 1.
Figure 3:
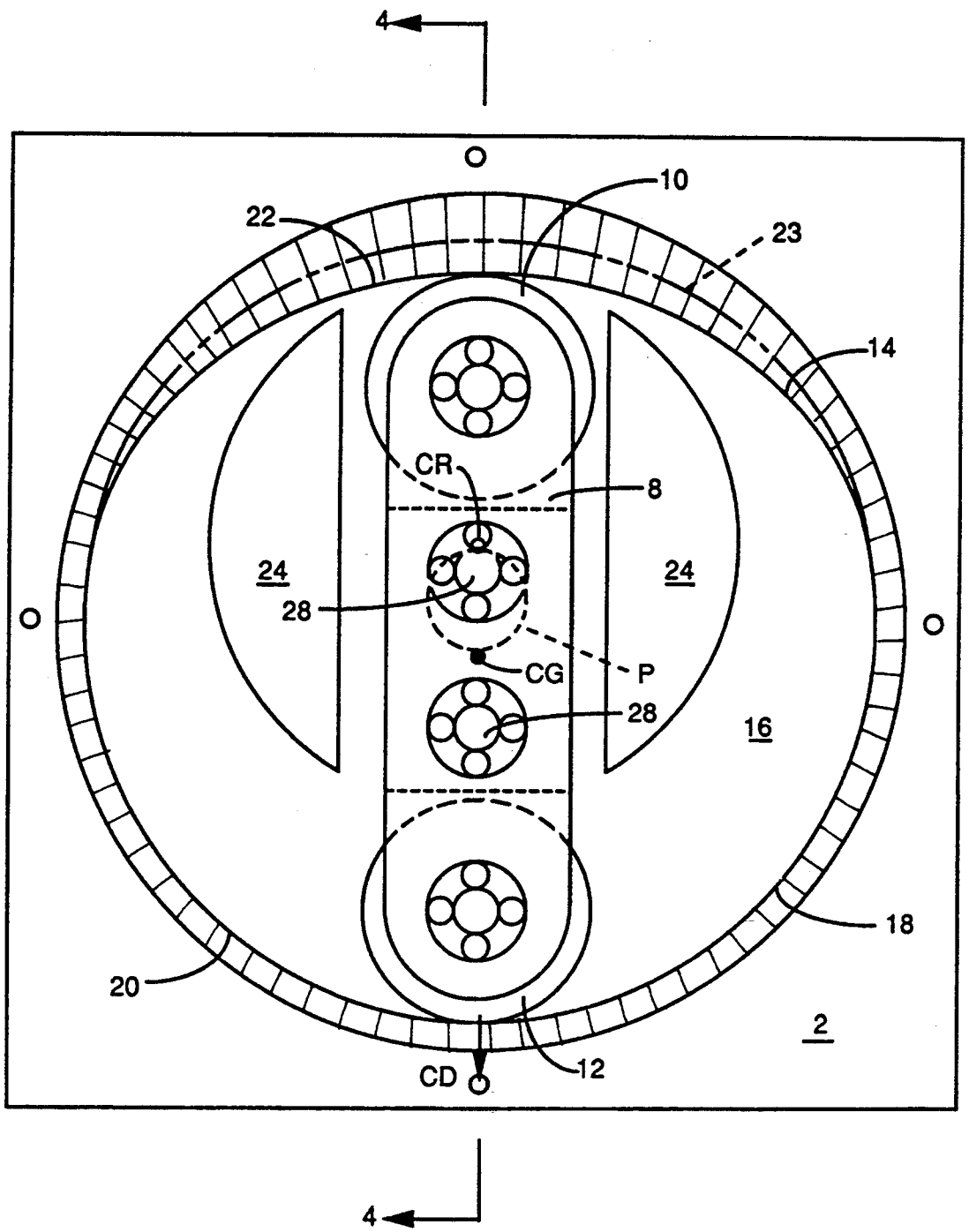
FIG. 3 is an elevational view of the embodiment of this invention shown in FIG. 1 with the masses shown in an unbalanced position about the center of rotation.
Figure 4:
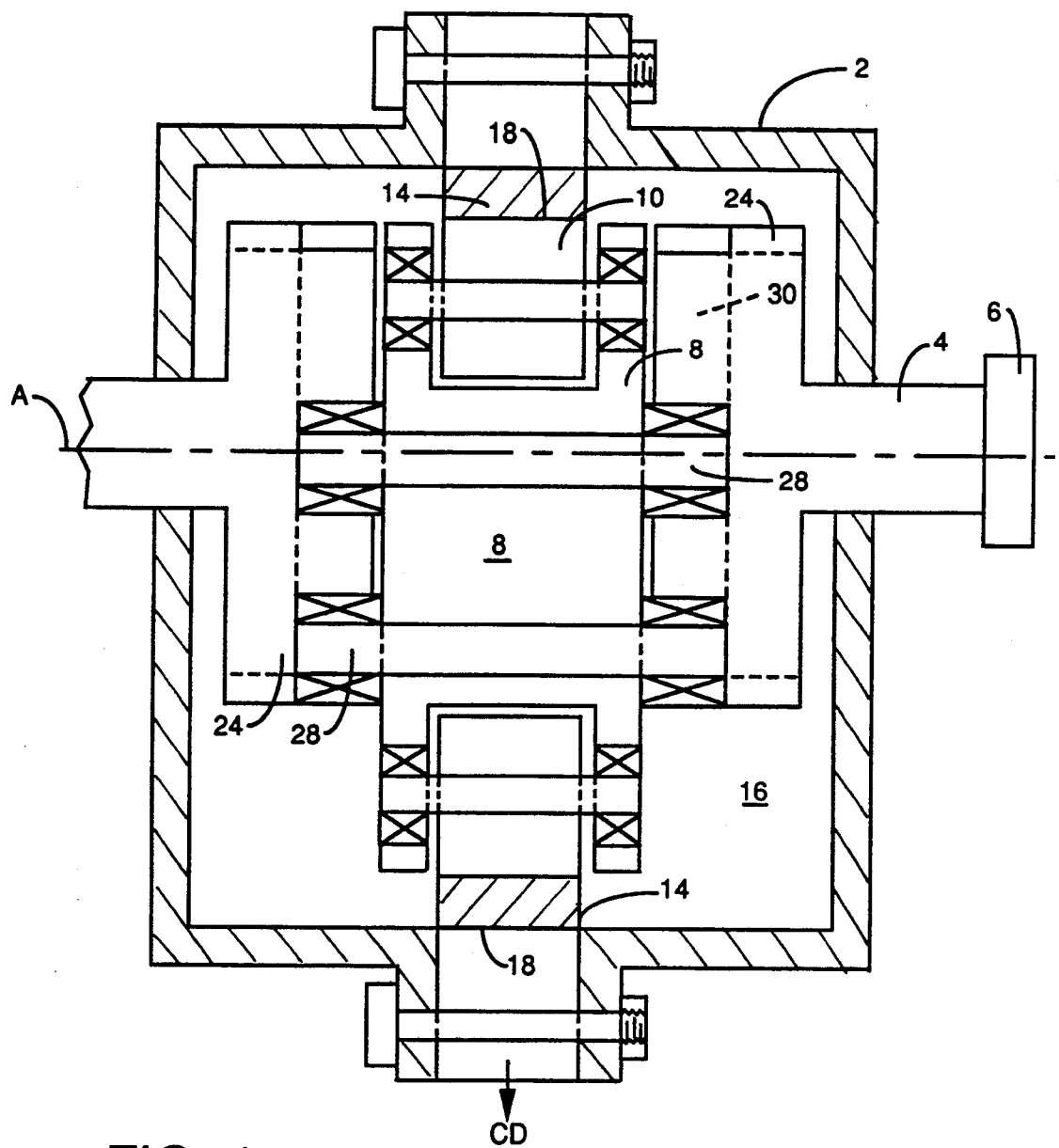
FIG. 4 is a cross-sectional view of the embodiment of this invention shown in FIG. 3 and taken through line 4—4 of FIG. 3.

Referring more particularly to FIG. 1, the apparatus of this embodiment is shown with mass 8 in a rotationally balanced position. Center of gravity CG of mass 8 is in generally the same location as the center of rotation CR of mass 8. As mass 8 rotates with shaft 4, mass 8 will move radially outward, constrained by the engagement of rollers 10, 12 and track 18. Rotation and radial movement of mass 8 causes the center of gravity of mass 8 to move in a path P that is generally the same shape as curved track 18. Path P extends generally in the controlled direction from the center of rotation CR. As mass 8 rotates from the position shown in FIG. 1, it exerts a component of force in the controlled direction CD. As mass 8 rotates toward the position shown in FIG. 3, the force in the controlled direction increases. When mass 8 reaches the position shown in FIG. 3, the force in the controlled direction is at is maximum. Further rotation returns the mass to a position similar to that shown in FIG. 1 and the magnitude of force in the controlled direction decreases until mass 8 is once again rotatably balanced about center of rotation CR and force in the controlled direction equals zero. This cycle is repeated twice during each revolution. The maximum force in the controlled direction is generated each time the mass reaches the position shown in FIG. 3. Because the mass has two identical ends, two such forces will be generated during each revolution of the mass 8.

Referring again to FIGS. 1 and 2, the shape of control means 14 of this embodiment enables the rollers 10, 12 to be in juxtaposition to track 18 during each entire revolution of mass 8. Keeping mass 8 in contact with control means 14 at all times during its revolution reduces the likelihood that damage could occur from the mass recontacting the control member after having travelled a portion of the rotation not in contact with the control member.

A machine of the embodiment of FIGS. 1–4 having a mass weighing 1200 lbs that includes two rollers 12 inches in diameter by 12 inches thick and traveling on a track having a nominal diameter of 45 inches with the center being offset by 6 inches and rotating at 1000 rpm would be expected to provide a force of approximately 115 tons. The same device rotating at 2000 rpm would be expected to generate a force of approximately 460 tons. This device would be particularly suitable for use as a pile driver. A machine of the embodiment of FIGS. 1–4 having a mass weighing 1800 lbs and having two rollers with diameters of 16 inches by 10 inches thick, traveling a track having a nominal diameter of 60 inches and a center offset by 10 inches would be expected to provide a force of approximately 287 tons when rotating at 1000 rpm and approximately 1150 tons at 2000 rpm. This configuration would be particularly suitable as a compactor.

Figure 5:
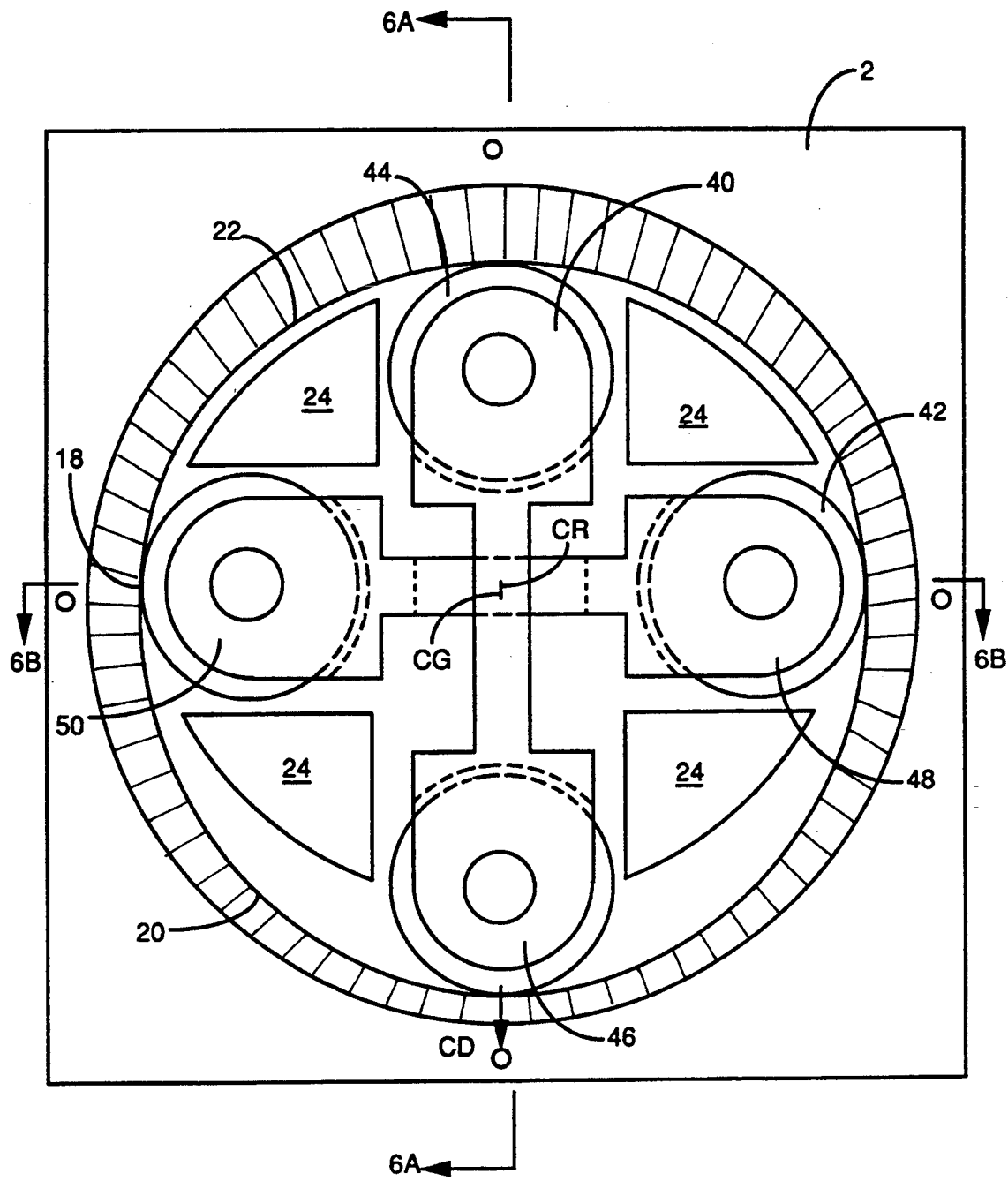
FIG. 5 is an elevational view of another embodiment of the centrifugal force drive machine of this invention.
Figure 6A:
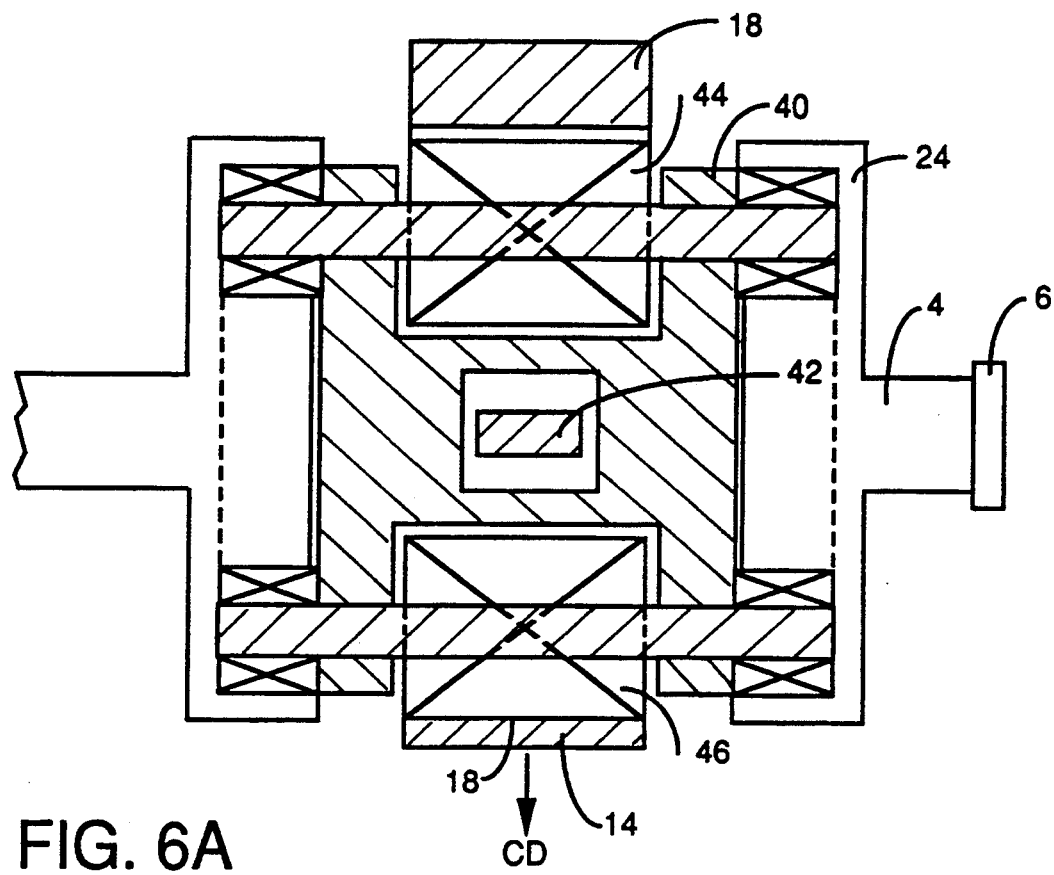
FIG. 6A is a partial cross-sectional view of the embodiment of this invention shown in FIG. 5 and taken through line 6A—6A of FIG. 5.
Figure 6B:
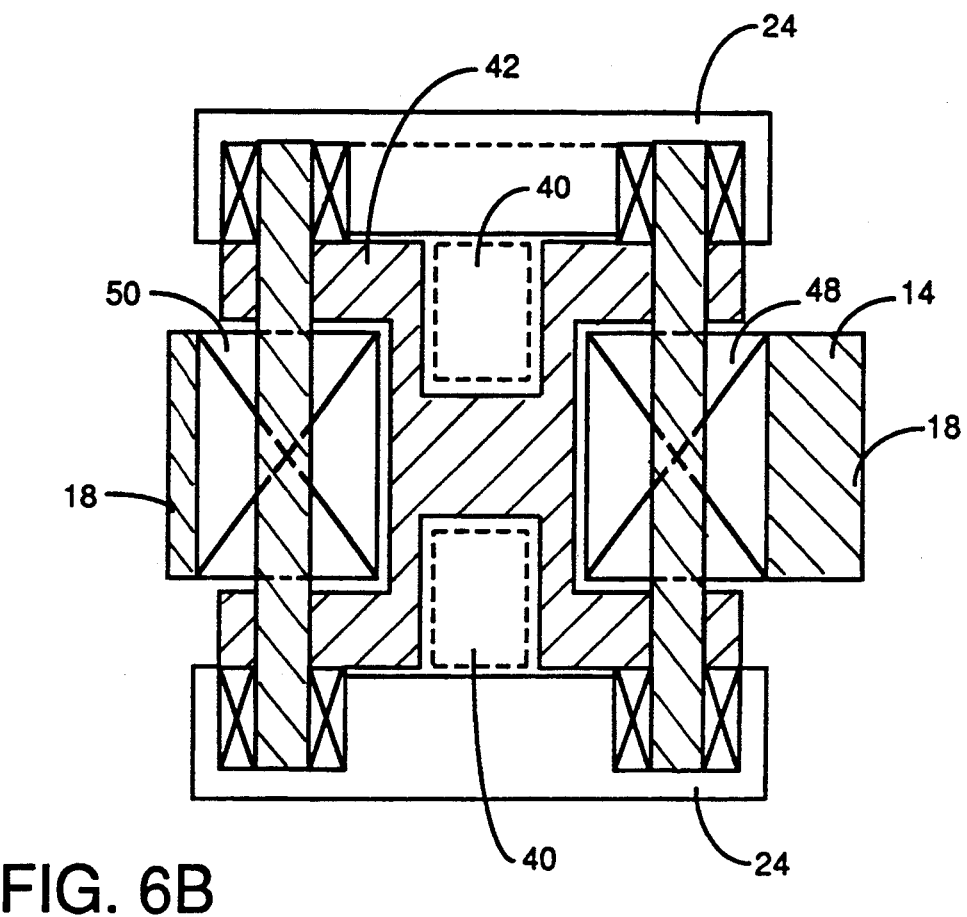
FIG. 6B is a partial cross-sectional view of the embodiment of this invention shown in FIG. 5 and taken through line 6B—6B of FIG. 5.

Referring now to FIGS. 5 and 6, there is shown another embodiment of the centrifugal force drive machine of this invention. This embodiment is virtually identical to that set forth above with respect to FIGS. 1–4, except that two elongated mass 40, 42 are provided. Each mass 40, 42 has at least one roller, 44, 46, 48, 50 mounted on each end thereof. Each roller is positioned to engage control member 14. The center of gravity CG of each mass 40, 42 is located generally midway between the rollers. Mass 40 is positioned generally perpendicular to mass 42.

Masses 40, 42 are mounted on shaft 4 for rotation therewith. The center of gravity CG of each mass 40, 42 is radially movable with respect to shaft 4 between a position in which the mass is radially balanced about shaft 4 and a position in which the mass is radially unbalanced about the shaft. Masses 40, 42 are mounted to shaft 4 to be independently radially moveable.

The configuration of track 18 is as set forth above with respect to FIGS. 1–4. This configuration permits all of the rollers on masses 40, 42 to remain in contact with track 18 during each entire revolution of the masses 40, 42. Track 18 is preferably adjustably mounted to frame 2 to permit variation of the controlled direction CD.

The use of two double-ended masses 40, 42 mounted perpendicular to one another for rotation with the shaft 4 results in the generation of four separate forces in the controlled direction during each revolution of shaft 4. The use of two masses also provides more counterbalance during rotation, thereby providing even greater reduction in the unbalanced lateral forces unloaded on the drive means.

Figure 7:
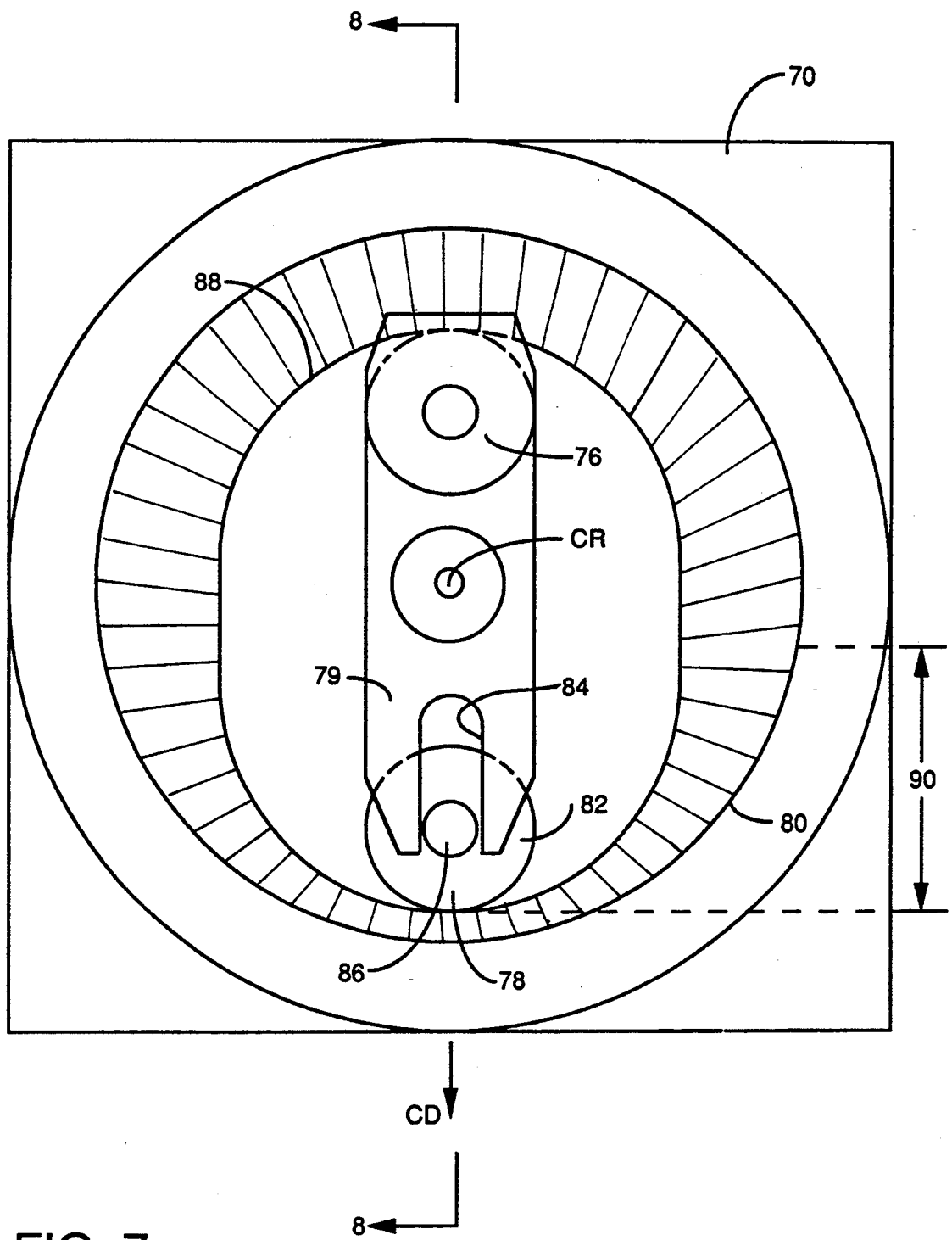
FIG. 7 is an elevational view of another embodiment of the centrifugal force drive machine of this invention.
Figure 8:
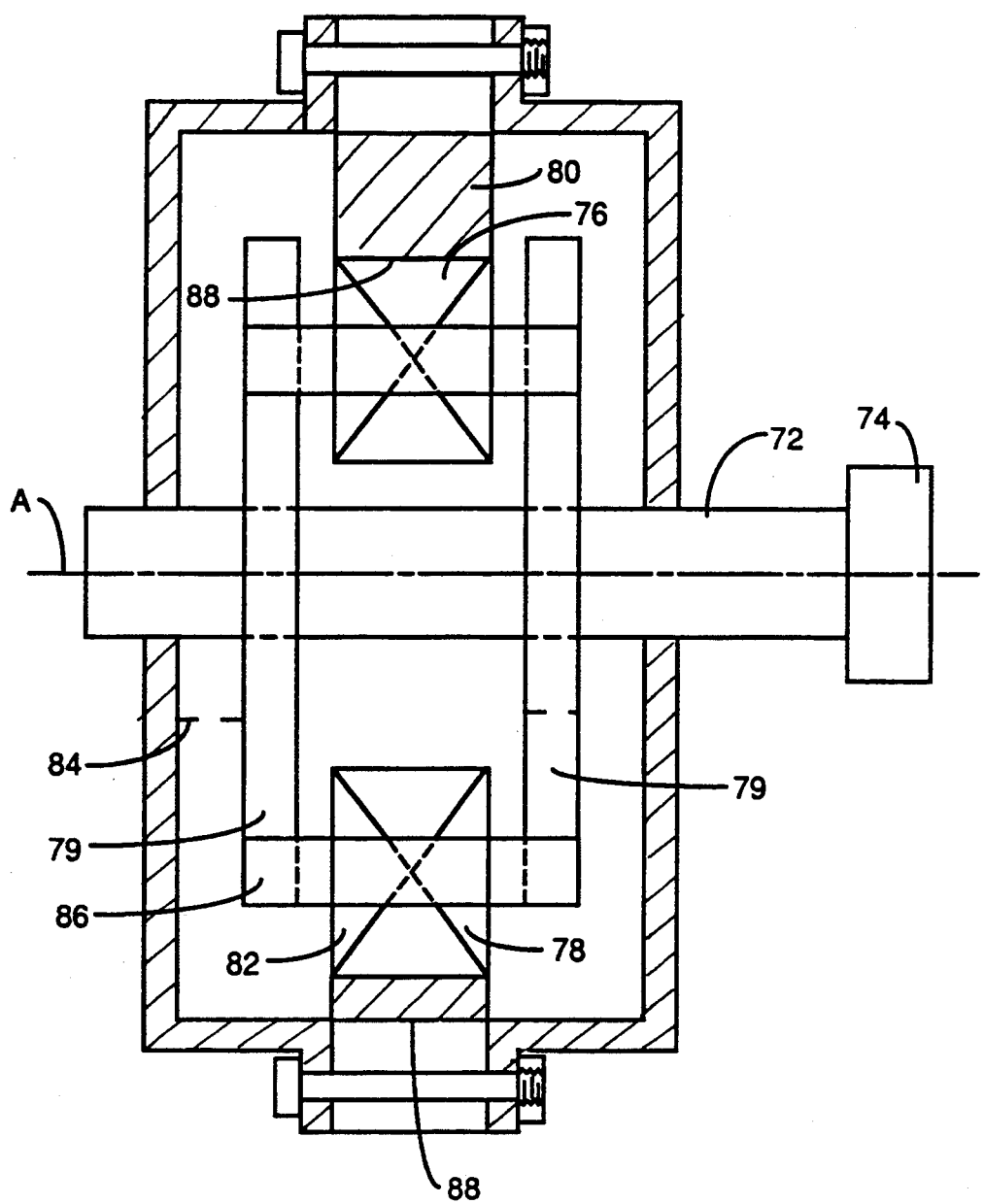
FIG. 8 is a cross-sectional view of the embodiment of this invention shown in FIG. 7 and taken through line 8—8 of FIG. 7.

Referring to FIG. 7 and 8, there is shown another embodiment of the centrifugal force drive machine of this invention. This embodiment includes machine frame 70 having a shaft 72 mounted thereto. Shaft 72 is rotatable about its axis. Power means 74 provided in driving connection to shaft 72 and are operable to rotate shaft 72 about its axis A. Power means 74 may rotate shaft 72 using direct drive, gear drive, belt drive, chain drive or any other suitable drive arrangement known to those skilled in the art. A mass 76 is mounted on shaft 72 for rotation with the shaft at a constant radius. A second mass 78 is mounted on shaft 72 for rotation therewith at a variable radius of rotation. A pair of brackets 79 connect the masses 76, 78 to one another and to shaft 72. A control member 80 in operable connection between second mass 78 and frame 70 constrains the second mass 78 to move so that the center of gravity thereof travels between a position with the same radius of rotation as the center of gravity of mass 76 and a position wherein the radius of rotation is different from the radius of rotation of the center of gravity of mass 76. When the radius of rotation of the center of gravity of second mass 78 is the same as the radius of rotation of the center of gravity of first mass 76, no eccentric moment is produced. When the radius of rotation of the center of gravity of second mass 78 is different from the radius of rotation of the center of gravity of mass 76 an eccentric moment results that increases the centrifugal force generated in that part of the revolution. The centrifugal force generated when the radius of rotation of the center of gravity of mass 78 is different from that of 76 is transferred to frame 70 through control member 80 to generate a force in the controlled direction.

In a preferred embodiment, mass 78 includes roller 82 for engaging control member 80. Roller 82 is radially movable within slot 84 in bracket 79. Roller 82 is rotatable about axle 86 which is received into and is radially movable within slot 84. Control member 80 preferably includes an opening in frame 70 mounted by a generally oval track 88. Track 88 is offset in the controlled direction CD from the center of rotation CR of shaft 72. Track 88 is preferably adjustably mounted to frame 70 to permit variation of controlled direction CD. As shaft 72 and masses 76, 78 rotate, roller 82 engages track 88. When mass 78 travels through the portion 90 of track 88 which lies in the controlled direction CD, the radius of rotation of mass 78 becomes larger than the radius of rotation of mass 76 and rotation becomes unbalanced. This unbalanced rotation produces an eccentric moment that generates a centrifugal force having a component in the controlled direction which is transferred to the frame, as discussed above. A force is thereby generated in the controlled direction. When mass 78 travels over the remainder of track 88, the center of rotation of masses 76, 78 are substantially the same and rotation is balanced. With this embodiment, one impulse or force is generated in the controlled direction during each revolution of shaft 72.

Figure 9:
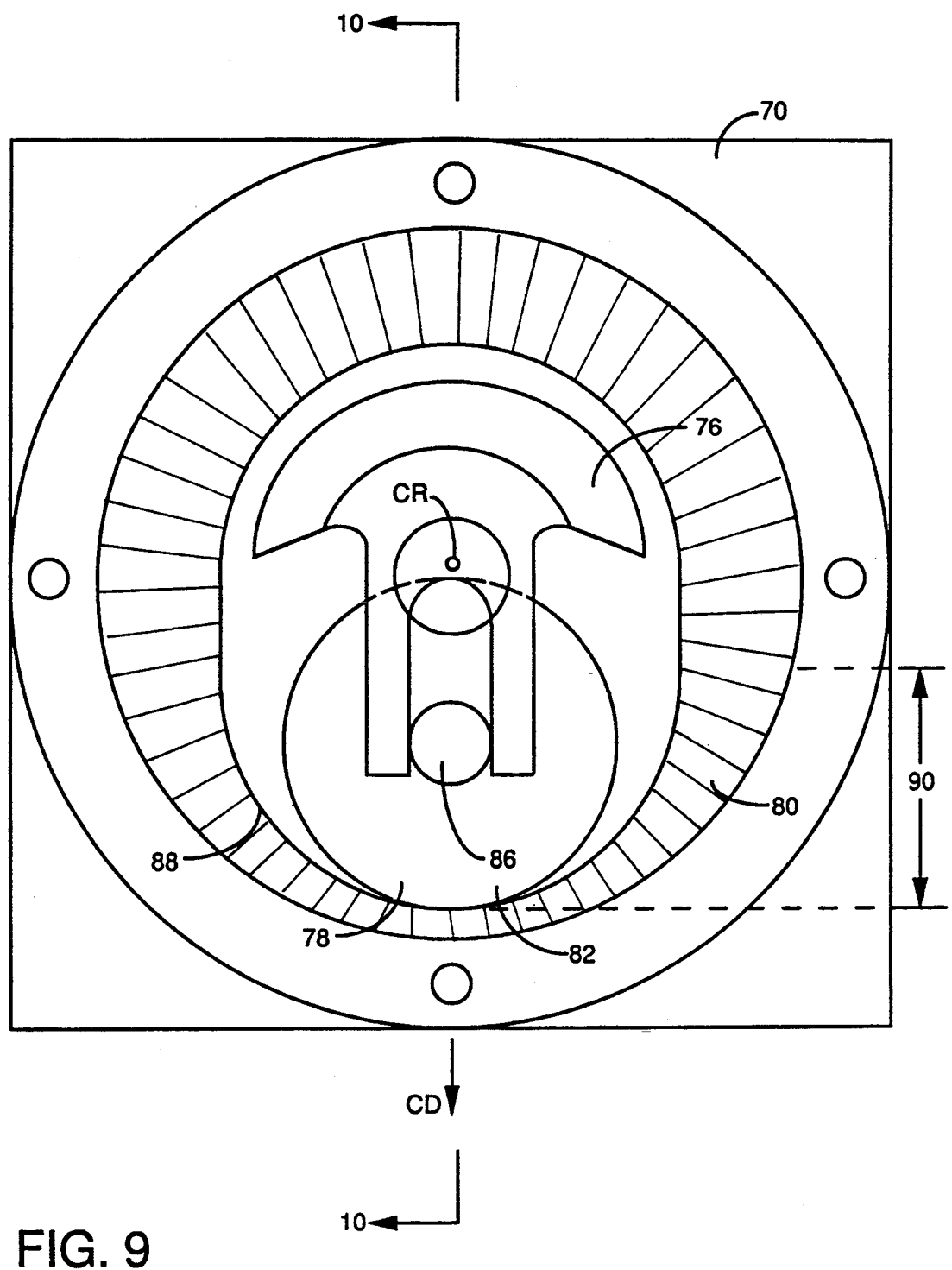
FIG. 9 is an elevational view of another embodiment of the centrifugal force drive machine of this invention.
Figure 10:
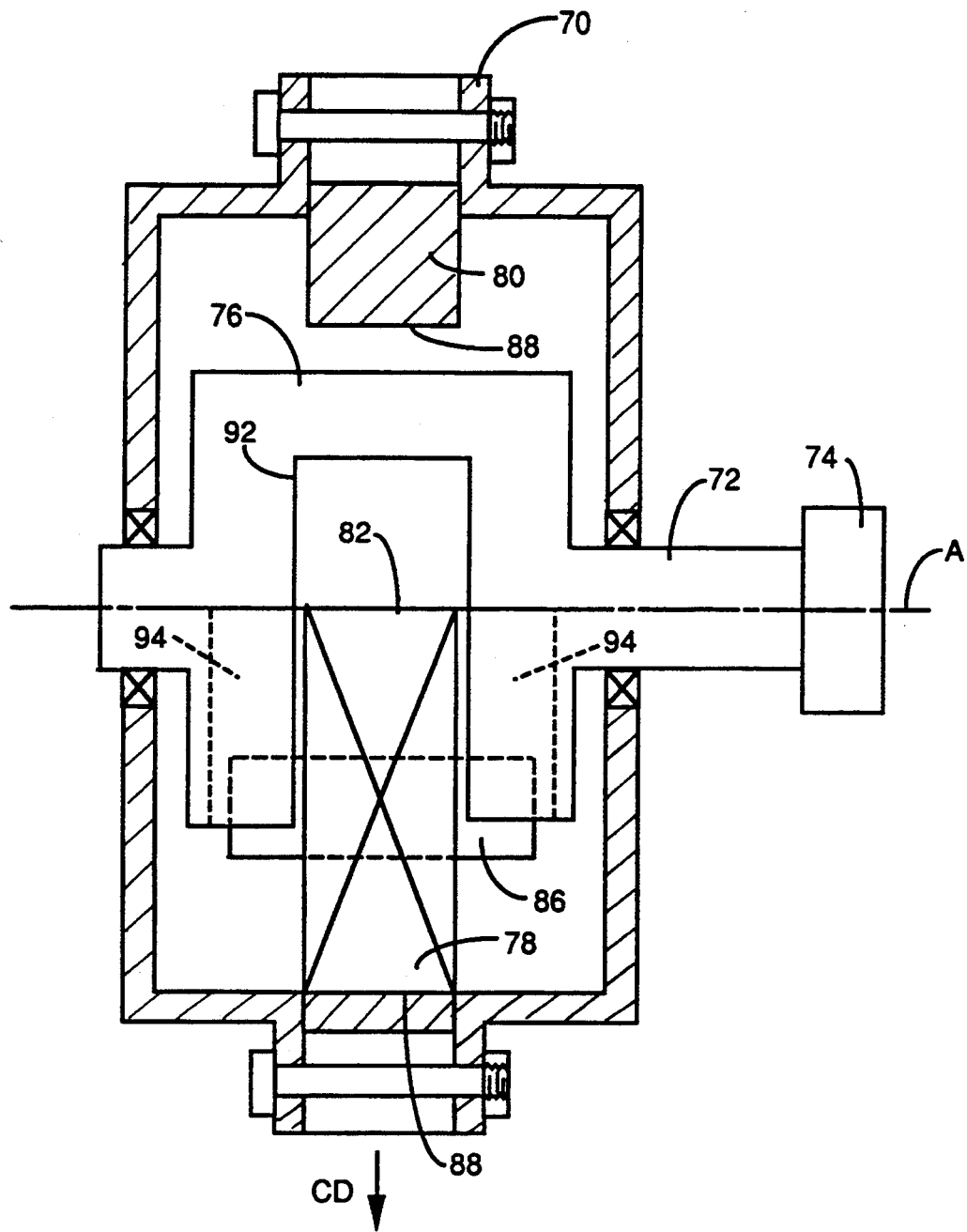
FIG. 10 is a cross-sectional view of the embodiment of this invention shown in FIG. 9 and taken through line 10—10 of FIG. 9.

Referring now to FIGS. 9 and 10, there is shown yet another embodiment of this invention. This embodiment is similar to the embodiment shown in FIGS. 7 and 8. The device includes frame 70, rotatable shaft 72, power means 74 and control member 80, which includes track 88. Shaft 72 includes an offset portion 92. Offset portion 92 of shaft 72 forms mass 76, which is mounted for rotation with shaft 72 at a fixed radius of rotation. Mass 78, which is radially movable with respect to shaft 72, includes roller 82 mounted on axle 86. Axle 86 is received into slots 94 in shaft 72 to facilitate radial movement of roller 82 with respect to shaft 72.

Rotation of the fixed mass 76 with movable mass 78 produces a flywheel effect of storing energy for one half of each revolution. The flywheel effect reduces the amount of power needed to maintain rotation of the masses and enables larger masses to be used, thereby providing greater forces in the controlled direction.

In operation, this embodiment works in substantially the same way as the embodiment shown in FIGS. 7 and 8. With this embodiment, as with the embodiment of FIGS. 7 and 8, one force is generated in the controlled direction during each rotation of shaft 72. Because larger masses may be used with this embodiment, greater forces may be generated using the same power input.

Figure 11:
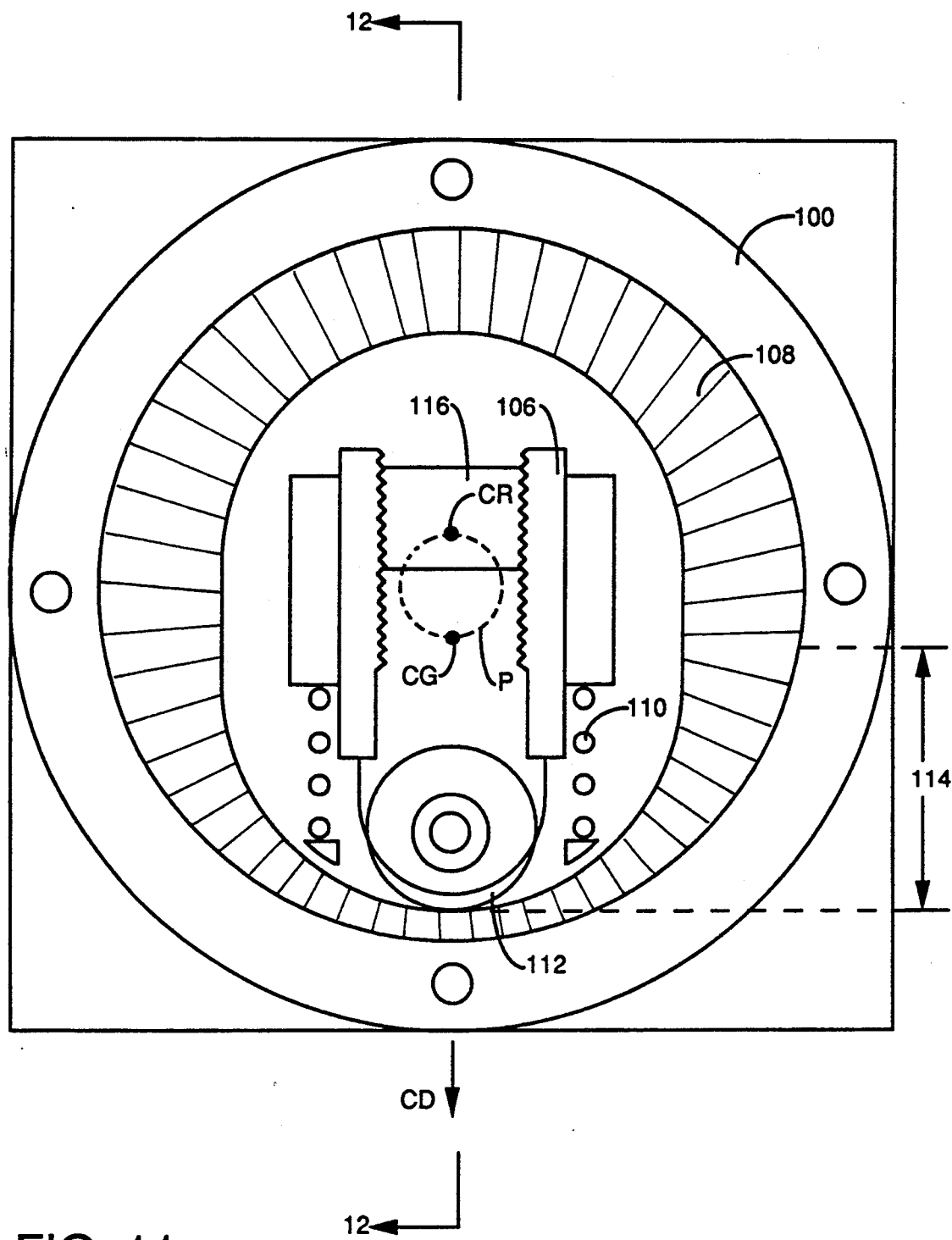
FIG. 11 is an elevational view of another embodiment of the centrifugal force drive machine of this invention.
Figure 12:
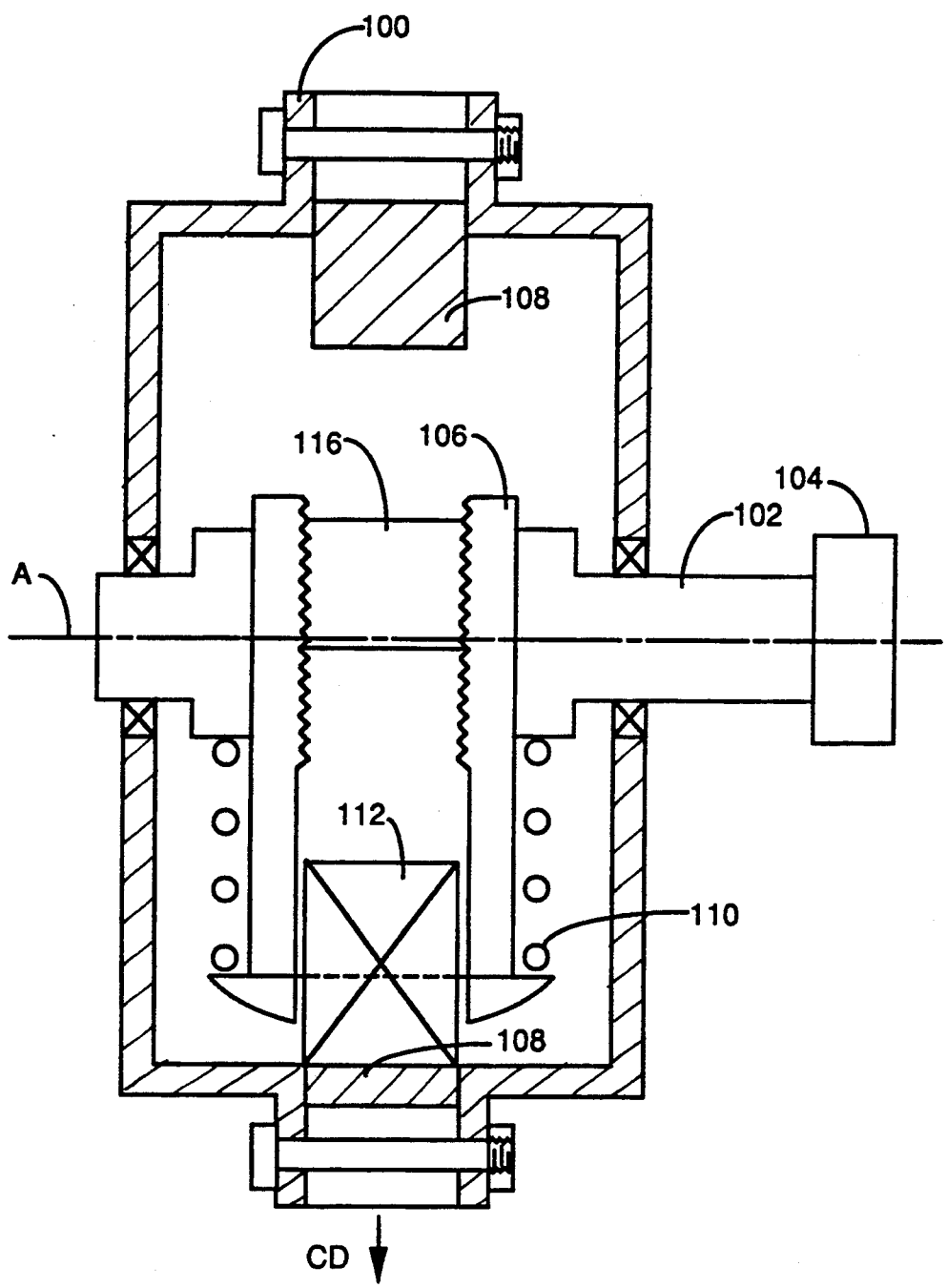
FIG. 12 is a cross-sectional view of the embodiment of this invention shown in FIG. 11 and taken through line 12—12 of FIG. 11.

Referring now to FIGS. 11 and 12, there is shown another embodiment of this invention. This embodiment includes machine frame 100 having shaft 102 mounted thereto. Shaft 102 is rotatable about its axis A. Power means 104 are provided in driving connection to shaft 102 and are operable to rotate shaft 102 about its axis A. Power means 104 may rotate shaft 102 using direct drive, gear drive, belt drive, chain drive or any other suitable drive arrangement known to those skilled in the art. Mass 106 is mounted in fixed rotational connection to shaft 102 and in unrestricted radial connection to shaft 102. Mass 106 has a center of gravity CG that is eccentric generally in the controlled direction with respect to axis A for at least one half of each revolution thereof and concentric with axis A for at least part of each revolution. Control member 108 forming an inwardly facing surface surrounding the axis A of shaft 102 and being of changing radius is provided. Control member 108 limits outward radial movement of mass 106 and transfers centrifugal force generated by rotation of the mass to the frame. Control member 108 is preferably adjustably mounted to frame 100 to permit variation of controlled direction CD as desired. Spring means 110 are positioned between mass 106 and shaft 102 to urge mass 106 radially outward. Mass 106 includes roller 112 preferably positioned to engage control member 108 during each entire revolution.

Control member 108 includes a generally oval track having a center offset from the axis A of shaft 102 in the controlled direction.

As shaft 102 and mass 106 rotate, engagement of roller 112 and control member 108 restrain radial movement of mass 106. As mass 106 rotates and radial movement thereof is constrained, the center of gravity CG of the mass 106 travels in the path P that is generally the same shape as the shape of control member 108. When roller 112 is in the portion 114 of control member 108 that is in the controlled direction, the center of gravity CG of the mass is offset in the controlled direction from the axis A of shaft 102 and rotation becomes unbalanced. The centrifugal force generated by the unbalanced rotation of mass 106 is transferred to the frame through control member 108, thereby generating a force in the controlled direction CD.

In this embodiment, mass 106 is provided with a threaded plug 116 which is positioned generally opposite roller 112. Threaded plug 116 can be radially adjusted to fine tune this apparatus. Adjusting the position of threaded plug 116 will change the center of gravity of mass 106, thereby enabling the user to make adjustments which ensure that the center of gravity of mass 106 travels on the desired path P.

While I have illustrated and described certain present preferred embodiments of my invention, it is to be understood that I do not limit myself thereto and that the invention may be otherwise and variously practiced within the scope of the following claims.

What is claimed is:

1. A centrifugal force drive machine for generating a force in a controlled direction comprising:

a machine frame;

a shaft mounted to the frame and rotatable about its axis;

power means in driving connection to the shaft and operable to rotate the shaft about its axis;

at least one mass having a constant length mounted on the shaft for rotation with the shaft about a center of rotation, each said mass having a center of gravity which is movable radially with respect to the shaft between a position in which the mass is rotationally balanced about the shaft and a position in which the mass is unbalanced; and a control member in operative connection between the frame and the mass, the control member constraining the mass to move between a balanced position and an unbalanced position in each one half revolution of the shaft and the mass.

2. The centrifugal force drive machine of claim 1, wherein each said mass is rotationally balanced about said shaft for one half of one revolution and rotationally unbalanced about said shaft for one half of one revolution.

3. The centrifugal force drive machine of claim 2, wherein the center of gravity of each said mass moves in a generally oval path between the center of rotation and a point spaced from the center of rotation in the controlled direction.

4. The centrifugal force drive machine of claim 3, wherein each said mass includes at least one roller for engaging said control member for at least part of each revolution.

5. The centrifugal force drive machine of claim 4, wherein said control member includes a generally oval opening in said machine frame bounded by a track, said track positioned to engage each said roller on each said mass for at least part of each revolution of each said mass, said track further having a center spaced from said center of rotation in the controlled direction.

6. The centrifugal force drive machine of claim 5, wherein said track is generally circular having a center spaced in the controlled direction from the center of rotation of said shaft.

7. The centrifugal force drive machine of claim 5, wherein two masses are provided forming a first pair of masses, said masses being positioned opposite one another with said center of rotation therebetween and being operatively connected and radially movable as a unit, whereby the center of gravity of said pair of masses moves in a generally circular path between the center of rotation and a point spaced from the center of rotation in the controlled direction.

8. The centrifugal force drive machine of claim 7, wherein four masses are provided, two said masses forming said first pair of masses and two masses forming a second pair of masses positioned opposite one another with said center of rotation therebetween and being operatively connected and radially movable as a unit, whereby the centers of gravity of both said pairs of masses move in a generally circular path between the center of rotation and a point spaced from said center of rotation in the controlled direction.

9. The centrifugal force drive machine of claim 8, wherein
said track is movable with respect to said center of rotation, whereby the controlled direction may be selected.

10. A centrifugal force drive machine of claim 1, wherein
one mass is mounted on said shaft, said mass being elongated and of constant length and having at least one roller mounted at each end to engage said control member with the center of gravity of said mass located between said rollers; and
said control member includes an opening in said machine frame bounded by a generally continuous track, said track having a first curved portion and a second curved portion, said first portion being generally semi-circular and having a constant radius and a center that is offset in the controlled direction from the center of rotation, and said second portion having a changing radius of curvature, said rollers at opposite ends of said mass being in juxtaposition to the track during each entire revolution of said mass.

11. A centrifugal force drive machine of claim 1, wherein
two masses are mounted on said shaft, a first elongated mass having at least one roller mounted at each end to engage said control member with said center of gravity of said mass located between said rollers, a second elongated mass having at least one roller mounted at each end to engage said control member with said center of gravity of said second mass located between said rollers, said second mass positioned generally perpendicular to said first mass; and
said control member includes an opening in said machine frame bounded by a generally continuous track, said track having a first curved portion and a second curved portion, said first portion being generally semi-circular and having a constant radius and a center that is offset in the controlled direction from the center of rotation, and said second portion having a changing radius of curvature, and said rollers at opposite ends of said masses being in juxtaposition to the track during each entire revolution of said masses.

12. The centrifugal force drive machine of claim 1, wherein
one mass is mounted on said shaft, said mass being elongated and of constant length and having at least one roller mounted at each end to engage said control member with the center of gravity of said mass located between said roller; and
said control member includes an opening in said machine frame bounded by a generally continuous circular track, said track having a center spaced from said center of rotation in the controlled direction, whereby each said roller engages said track during at least part of each revolution of said mass.

13. The centrifugal force drive machine of claim 1, wherein
two masses are mounted on said shaft, a first elongated mass having at least one roller mounted on each end to engage said control member with said center of gravity of said mass located between said rollers, a second elongated mass having at least one roller mounted at each end to engage said control member with said center of gravity of said second mass located between said rollers, said second mass being positioned generally perpendicular to said first mass; and
said control member includes an opening in said machine frame bounded by a generally continuous circular track, said track having a center spaced from said center of rotation in the controlled direction, whereby each said roller engages said track during at least part of each revolution of said masses.

14. A centrifugal force drive machine for generating a force in a controlled direction comprising:
a machine frame;
a shaft mounted to the frame and rotatable about its axis;
power means in driving connection to the shaft and operable to rotate the shaft about its axis;
a mass of constant length in fixed rotational connection to the shaft and in unrestricted radial connection to the shaft, said mass has a center of gravity that is eccentric generally in the controlled direction about the axis for at least one-half of each revolution and concentric with the axis for at least part of each revolution;
control means forming an inwardly facing surface surrounding the axis of the shaft and being of changing radius, the control means limiting outward movement of the mass and transferring centrifugal force generated by rotation of the mass to the frame.

* * * * *